(12) United States Patent
Ledetzky et al.

(10) Patent No.: US 8,511,451 B2
(45) Date of Patent: Aug. 20, 2013

(54) CLUTCH ASSEMBLY

(75) Inventors: Erol Ledetzky, Heilbronn (DE); Jochen Krenkler, Neuenstein (DE)

(73) Assignee: Hoerbiger Synchron Technik GmbH & Co. KG (DE)

( * ) Notice: Subject to any disclaimer, the term of this patent is extended or adjusted under 35 U.S.C. 154(b) by 695 days.

(21) Appl. No.: 12/527,860

(22) PCT Filed: Feb. 22, 2008

(86) PCT No.: PCT/EP2008/001445
§ 371 (c)(1),
(2), (4) Date: Aug. 19, 2009

(87) PCT Pub. No.: WO2008/101729
PCT Pub. Date: Aug. 28, 2008

(65) Prior Publication Data
US 2010/0078283 A1 Apr. 1, 2010

(30) Foreign Application Priority Data
Feb. 22, 2007 (DE) .......................... 10 2007 010 307

(51) Int. Cl.
*F16D 23/06* (2006.01)
(52) U.S. Cl.
USPC ....................................... 192/53.341; 74/339
(58) Field of Classification Search
USPC .......................................... 192/53.34, 53.341
See application file for complete search history.

(56) References Cited

U.S. PATENT DOCUMENTS

| | | | |
|---|---|---|---|
| 4,349,090 A | 9/1982 | Griesser | 192/53 |
| 4,425,990 A | 1/1984 | Griesser | 192/53 |
| 4,830,159 A * | 5/1989 | Johnson et al. | 192/53.34 |
| 2006/0011440 A1* | 1/2006 | Giese et al. | 192/53.341 |
| 2007/0199786 A1 | 8/2007 | Hiraiwa | 192/53.34 |
| 2008/0066568 A1 | 3/2008 | Hackl et al. | 74/339 |

FOREIGN PATENT DOCUMENTS

| | | |
|---|---|---|
| DE | 29 15 965 | 10/1980 |
| DE | 10 2005 025 569 | 12/2006 |
| DE | 10 2005 028 803 | 1/2007 |
| EP | 1 826 431 | 8/2007 |
| EP | 1 900 956 | 3/2008 |
| GB | 2 048 399 | 12/1980 |

\* cited by examiner

*Primary Examiner* — Rodney Bonck
(74) *Attorney, Agent, or Firm* — Hayes Soloway P.C.

(57) ABSTRACT

A clutch assembly for connecting a shaft to a rotary member mounted on said shaft in a rotationally fixed manner comprises: a sliding sleeve which is rotationally fixed to the shaft, is axially slidably mounted on said shaft and is provided with a first gearing. A clutch body is rotationally fixed to the rotary member and provided with a second gearing which can mesh with the first gearing to connect the shaft and the rotary member in a rotationally fixed manner. And, a locking synchronization unit having a synchronizer ring with a friction surface the ring permitting the speeds of the shaft and the rotary member to be synchronized before the meshing of the first and second gearings. The locking synchronization unit further comprises a locking member which is coupled to the sliding sleeve by a detent groove and to the synchronizer ring in the rotational direction (D) by a pair of locking surfaces. The pair of locking surfaces are situated between the locking member and a synchronizer member, the latter being coupled to the locking member in the axial direction (A) and to the synchronizer ring in the rotational direction (D).

22 Claims, 9 Drawing Sheets

CLUTCH ASSEMBLY

BACKGROUND OF THE INVENTION

The present invention relates to a clutch assembly for connecting a shaft to a rotary member, such as an idle gear, mounted on said shaft in a rotationally fixed manner, wherein the clutch assembly comprises: a sliding sleeve which is rotationally fixed to the shaft, is axially slidably mounted on said shaft and is provided with a first gearing, a clutch body which is rotationally fixed to the rotary member and provided with a second gearing which can mesh with the first gearing to connect the shaft and the rotary member in a rotationally fixed manner, and a locking synchronisation unit having a synchroniser ring with a friction surface, said ring permitting the speeds of the shaft and the rotary member to be synchronised before the meshing of the first and second gearings, wherein the locking synchronisation unit further comprises a locking member which is coupled to the sliding sleeve by means of a detent groove and to the synchroniser ring in the rotational direction by means of a pair of locking surfaces.

Such a clutch assembly is known from DE 10 2005 025 569 A1.

Clutch assemblies of the generic type are used in countershaft transmissions of motor vehicles. The countershaft transmissions are herein formed as stepped transmissions with a plurality of gear ratios. Each gear ratio is associated with a set of wheels comprising a fixed wheel and an idle gear. The idle gears are respectively supported at one of the shafts of the transmission and can be connected to the shaft by means of a clutch (to shift into gear) and released therefrom (to disengage the gear).

Clutches are nowadays usually formed as synchroniser clutches, in which the speeds of shaft and rotary member are synchronised before establishing a positive locking therebetween. Further, synchroniser clutches are nowadays mainly formed as locking synchroniser clutches in which a locking mechanism provides that the engagement of the gearings of sliding sleeve and clutch body is only enabled when the speeds of the shaft and the rotary member are synchronised.

The locking mechanism most used today comprises a locking gearing at the outer periphery of the synchroniser ring. The synchroniser ring is supported at the shaft (or a guiding sleeve attached thereto, which is also referred to as a synchroniser body) to be movable in a restricted range. In a release position, the sliding sleeve gearing can be passed through the locking gearing of the synchroniser ring in order to establish the positive locking with the clutch body. In the locked position, the synchroniser ring is twisted such that the sliding sleeve is prevented to be moved in the axial direction toward the clutch body. The locked position of the synchronizer ring is obtained by frictionally engaging the synchroniser ring with the associated clutch body (or any other associated friction surface) due to the applied axial shifting force. Consequently, the synchroniser ring is driven in the rotational direction and thus into the locked position. Only after synchronisation of the speeds, the friction force is reduced so far that a turning back of the synchroniser ring due to the shifting force is possible, such that the sliding sleeve can be pushed through the gearing of the synchroniser ring, which gearing was turned back into the release position.

In this kind of synchronisation, the synchroniser ring has to be produced in a comparatively complex manner.

The aforementioned DE 10 2005 025 569 A1 proposes a locking mechanism which is realized by using a pressure piece.

Such a pressure piece or stone is often used in synchroniser clutch assemblies to lock the sliding sleeve in a neutral position. In DE 10 2005 025 569 A1, it is now proposed to form the synchroniser ring without a locking gearing at its outer periphery. Contrary thereto, a plurality of wedged surfaces is provided at the inner periphery of the synchroniser ring, which are assigned to corresponding wedged surfaces of the pressure pieces.

When applying a shifting force, the sliding sleeve tries to move the pressure piece in the radial direction away from the detent groove, and simultaneously pushes the synchroniser ring in the axial direction against a friction surface (starting synchronisation). Hereby, the synchroniser ring is twisted until the pairs of wedged surfaces engage, such that the wedged surfaces counter-effect a radial pushing away of the pressure piece. Accordingly, the sliding sleeve can no longer be displaced axially and is locked in this way. Only after synchronising the speeds of the shaft and the idle gear, the synchroniser ring can be turned back by the shifting force applied to the sliding sleeve, due to the then decreased friction force, such that the pressure piece can be pushed away in the radial inward direction. Consequently, the sliding sleeve can be further displaced in the axial direction in order to engage with the clutch body.

A similar locking mechanism for a synchroniser clutch is known from DE 29 15 965 C2.

Also in this kind of synchroniser clutch assembly, however, the synchroniser ring has to be produced in a comparatively complex manner.

SUMMARY OF THE INVENTION

It is therefore an object underlying the invention to provide a clutch assembly in which the synchroniser ring can be produced cost-effectively while providing an optimised function of the locking mechanism.

This object is solved by the aforementioned clutch assembly in that the pair of locking surfaces is formed between the locking member and a synchroniser member which is coupled to the locking member in the axial direction and to the synchroniser ring in the rotational direction.

In the inventive clutch assembly, the synchroniser ring can be formed without a locking gearing at its outer periphery, as is provided in the state of the art. In addition, it is possible to form the synchroniser ring also without any other wedged surfaces. It is only required to couple the synchroniser ring with the synchroniser member in the rotational direction. The synchroniser member, in turn, meshes with the locking member in the rotational direction by means of the pair of locking surfaces.

Consequently, the synchroniser ring may have a particularly simple construction, since it can be produced by simple manufacturing methods (from metal sheet, as a sintered part etc.).

Further, the locking member as well as the synchroniser member can be formed comparatively simple, such that they can be manufactured at low costs.

The object is therewith completely solved.

In a particularly preferred embodiment, the synchroniser member is supported in the rotational direction with respect to a guiding sleeve connected to the shaft to be movable in a restricted manner between a release position and a locked position, such that the synchroniser member, when in the locked position, prevents a movement of the locking member from the detent groove and thus an axial movement of the sliding sleeve.

Basically, it is also conceivable to support the synchroniser ring to be movable in a restricted range with respect to the sliding sleeve. The design of the sliding sleeve and the synchroniser member such that the synchroniser member can be moved between the locked position and the release position enables a further simplification of the formation of the synchroniser ring.

According to a further preferred embodiment, the synchroniser ring comprises a recess in which a portion of the synchroniser member is arranged to be coupled with the synchroniser ring in the rotational direction.

In this embodiment, the connection of the synchroniser ring and the synchroniser member in the rotational direction occurs through recesses in the synchroniser ring. Such recesses can be produced comparatively easily. The portion of the synchroniser member engaging in the recess may be a protrusion, but may also be a portion of a synchroniser member which is formed as a compact body.

It is particularly preferred that the recess of the synchroniser ring is formed as an axial recess. This enables a further simplification of the manufacturing method.

The recess of the synchroniser ring, however, can also be formed by two radially or axially protruding noses, between which a portion of the synchroniser member engages.

Contrary, it is also possible that the synchroniser ring comprises a protrusion which engages with a recess of the synchroniser member in order to be coupled to the synchroniser member in the rotational direction.

According to a further preferred embodiment, the locking member is guided at the sliding sleeve in the axial direction.

This embodiment is considered to be an independent invention, irrespective of the provision of a synchroniser member.

The axial guidance of the locking member is preferably not only performed when the locking member engages with the detent groove, but also when the sliding sleeve pushed away the locking member in the radial direction, such that the locking member no longer engages with the detent groove.

Altogether, a clearly stronger guidance of the components of the clutch assembly can be achieved in this way.

It is particularly advantageous that the sliding sleeve comprises a radial recess in which the locking member is axially guided.

Herein, the radial recess may be formed by recesses at teeth of the first gearing. Such axial guiding grooves at the inside of the sliding sleeve can be manufactured comparatively easily as far as construction is concerned.

According to a further preferred embodiment, the locking member comprises at least one guiding nose which engages with a tooth gap of the first gearing for an axial guidance at the sliding sleeve.

The guiding nose can extend in the radial direction beyond a portion of the locking member, which engages with the detent groove of the sliding sleeve.

In this way, an axial guidance at the sliding sleeve can be obtained without providing larger recesses at individual teeth of the gearing of the sliding sleeve. Altogether, the sliding sleeve may be formed substantially without any disadvantages in view of its strength.

In total, it is further preferred that the locking member is elastically biased in the radial direction with respect to the shaft or the guiding sleeve and is pushed into the detent groove.

The biasing may e.g. be performed by a spring which is arranged between the locking member and the shaft or the guiding sleeve.

According to a preferred embodiment, the locking member is biased in the radial direction with respect to the synchroniser member and is pushed into the detent groove.

Since the synchroniser member is supported at the guiding sleeve anyway, no further means are required at the guiding sleeve for elastically biasing the locking member.

According to a particularly preferred embodiment, the locking member comprises a recess for receiving a spring member for realising the elastic biasing.

In this way, a spring member, e.g. a coil spring, can be easily mounted and securely guided during operation.

It is particularly advantageous if the locking member and the synchroniser member are formed as a pre-assembled unit.

The assembly may therewith be clearly simplified.

In this context, it is particularly advantageous if the pre-assembled unit comprises springs for elastically biasing the locking member with respect to the synchroniser member.

In this embodiment, the locking member, the synchroniser member and the springs form a pre-assembled unit which can be inserted into the guiding sleeve with a low assembly effort.

In total, it is further preferred that the locking member and/or the synchroniser member is/are formed as a sintered part.

In this way, a cost-effective production is possible.

Also the synchroniser ring may preferably be formed as a sintered part.

According to a particularly preferred embodiment, the synchroniser member is formed as a bent metal sheet part.

In this embodiment, the synchroniser member may serve as a kind of cage for the locking member and possibly also as spring member.

Also the locking member can be formed as a sheet metal part or a bent sheet metal part. Further, it is conceivable to also form the synchroniser ring as a sheet metal part.

Further, it is conceivable to form the locking member and/or the synchroniser member as a forging.

In total, it is further preferred that the clutch assembly comprises a plurality of locking synchronisation units which respectively comprise a locking member and a synchroniser member and are arranged distributedly about the periphery of the clutch assembly.

Dependent on the embodiment, the inventive clutch assembly may achieve the following advantages:

- The synchroniser ring can be manufactured clearly simpler and at lower costs; further, the synchroniser ring can be formed ruggedly. The installation space can be reduced.
- Since the synchroniser ring does not require a radially protruding collar for the locking gearing, the length of the gearing of the guiding sleeve (at which the sliding sleeve is axially guided) may be longer in the axial direction, such that the guidance of the sliding sleeve is enhanced (reduced lateral buckling); further, the stopper teeth of the sliding sleeve (which limit the axial shifting path of the sliding sleeve with respect to the clutch body) can extend toward the clutch body without clamping. Therewith, the strength for transmitting a torque through the synchroniser ring can be increased.
- The locking member and the synchroniser member can be formed identically for different locking synchronisation units. In particular, they can also be formed identically for both sides of the clutch assembly. In other words: The locking member and the synchroniser member can be formed symmetrically with respect to a cross-sectional plane and/or a longitudinal sectional plane.
- Further, the synchroniser ring can be formed identically for single and multi cone synchronisations.

The locking mechanism is separated from the merging mechanism, such that the pointing of the sliding sleeve for merging into the clutch body can be freely selected without consideration of a locking angle. Therewith, the merging behaviour is enhanced, in particular by more acute merging angles.

A lifting of the synchroniser ring (e.g. by a pair of lifting wedged surfaces) can be realised comparatively easily. The drag moment can be reduced.

The merging gearing of the sliding sleeve can be formed in one plane, such that the manufacturing costs of the sliding sleeve are reduced.

When forming chamfers at the detent groove, in particular the process of the unlocking step can be influenced appropriately. The so-called "double engagement" occurring upon a premature merging of the sliding sleeve into the clutch body before equal speeds are obtained may therefore be prevented. With such a stepped detent groove (including a chamfer), an underlocking system can be obtained which is able to decelerate a wheel again accelerating. Cold scraping and vibration scraping can be reduced.

It may be prevented that depositions provided at the first gearing of the sliding sleeve contact the synchroniser ring, as it is the case with synchroniser rings having a locking gearing.

The synchroniser ring can be centered due to the connection with the synchroniser member. A centering diameter at the synchroniser ring and at the guiding sleeve may possibly be omitted.

It is obvious that the aforementioned features and the features to be explained in the following cannot only be used in the respectively described combination, but also in other combinations or alone, without leaving the scope of the present invention.

BRIEF DESCRIPTION OF THE DRAWING

Embodiments of the invention are shown in the drawing and explained in more detail in the following description, wherein.

DETAILED DESCRIPTION OF THE INVENTION

Figure 1:
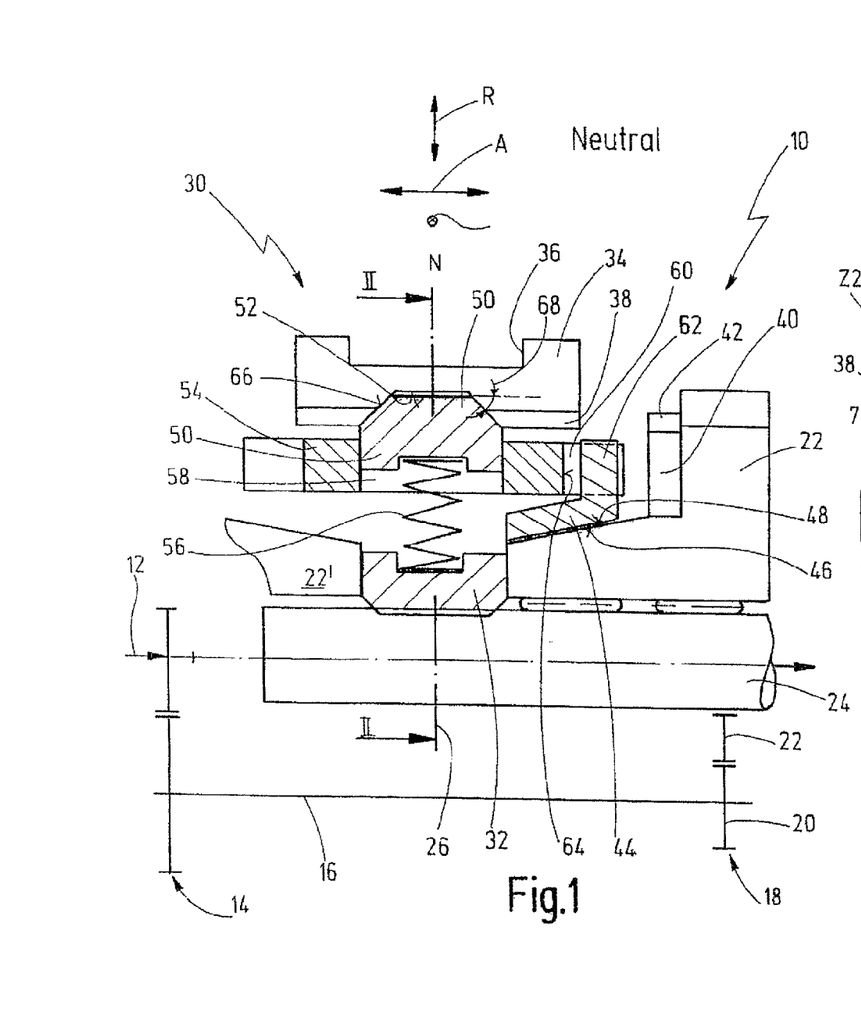
FIG. 1 shows a schematic longitudinal sectional view of an embodiment of the inventive clutch assembly.
Figure 2:
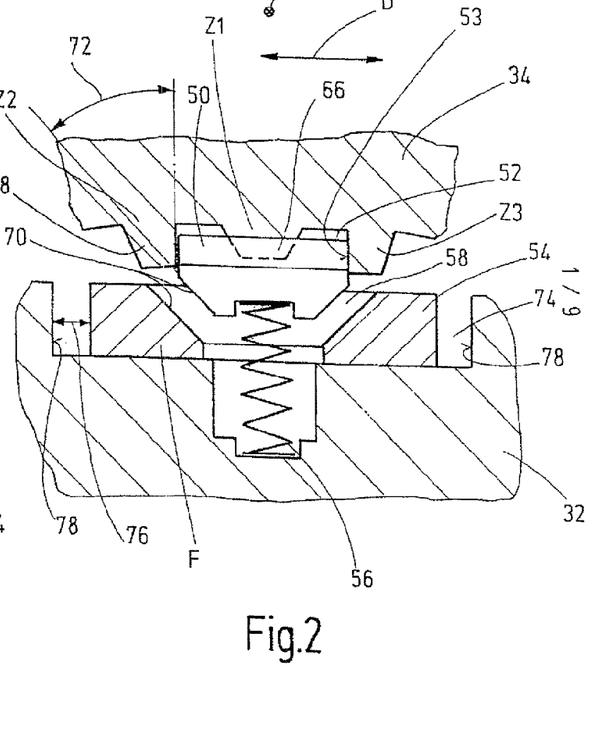
FIG. 2 shows a sectional view along line II-II of FIG. 1.

In FIGS. 1 and 2, a transmission for a vehicle is generally designated with 10.

The transmission 10 comprises an input shaft 12 which is connected to a countershaft 16 through a constant gear set 14 parallel thereto.

An output shaft 24 is arranged co-axially with the input shaft 12. A plurality of shift gear sets 18 is arranged at the countershaft or the output shaft 24, respectively. In FIG. 1, only one shift gear set 18 is shown for a clearer representation, which comprises a fixed wheel 20 connected to the countershaft 16. The shift gear set 18 further comprises an idle gear 22 which is supported rotatably at the output shaft 24.

A further idle gear 22' is only schematically indicated in FIG. 1.

It is obvious that the shown transmission assembly adapted for a longitudinal mounting in a vehicle only represents an example. The invention is also applicable for transmissions having different topologies (e.g. for the front-transverse-mounting or as a three shaft transmission).

A first embodiment of an inventive clutch assembly is generally designated with 30 in FIG. 1.

The clutch assembly 30 serves to couple the idle gear 22 or the idle gear 22' to the output shaft 24. Consequently, the clutch assembly 30 is formed as a clutch pack including two individual clutches. For reasons of simple illustration, the following description only refers to the function of the clutch assembly 30 with respect to the idle gear 22. It is, however, obvious that the following description is also applicable for the idle gear 22'.

The clutch assembly 30 comprises a guiding sleeve (also referred to as synchroniser body) 32 which is attached to the output shaft 24 (e.g. by means of an appropriate gearing). The guiding sleeve 32 further comprises an outer gearing which is not shown in detail in FIG. 1.

A sliding sleeve 34 is supported at the guiding sleeve 32 in a manner to be slidable in an axial direction A. The sliding sleeve 34 comprises—in a manner known per se—an outer radial groove 36 to be engaged with a shift fork or the like. Further, the sliding sleeve 34 comprises an inner gearing 38 at its inner periphery, which in engaged with the outer gearing of the guiding sleeve 32.

The clutch assembly 30 further comprises a clutch body 40 which is fixedly connected to the associated idle gear 22. The clutch body 40 comprises an outer gearing 42 onto which the inner gearing 38 of the sliding sleeve 34 can be slid on in order to establish a form-fit connection between the shaft 24 and the idle gear 22 in the rotational direction D. Although the guiding sleeve 32 and the shaft 24 on the one hand and the idle gear 22 and the clutch body 40 on the other hand are respectively shown as individual components, the invention also provides that same may be formed integrally.

The clutch assembly 30 further comprises a synchroniser ring 44. The synchroniser ring 44 comprises—in a manner known per se—a friction surface 46 which co-effects with a counter friction surface 48 of the idle gear 22 (or of the clutch body 40 or of an intermediate cone ring).

The clutch assembly 30 further comprises a locking member 50 which is supported to be movable in the radial direction R. In the neutral position shown in FIGS. 1 and 2, the locking member 50 engages with a detent groove 52 at the inner periphery of the sliding sleeve 34. As is shown in FIG. 2, the locking member 50 is axially guided at the inner periphery of the sliding sleeve 34. For this purpose, the sliding sleeve 34 comprises an axial guiding groove 53 at its inner periphery. The axial guiding groove 53 is formed between two teeth Z2, Z3 of the inner gearing 38. An intermediately arranged tooth Z1 is somewhat retreated in the radial direction, in order to guarantee an axial guidance of the locking member 50 even if the locking member 50 is pushed out of the detent groove 52 (to be described in the following).

The clutch assembly 30 further comprises a synchroniser member 54 which is formed as a component separately from the locking member 50 and separately from the synchroniser ring 44.

The clutch assembly 30 further comprises springs 56 which serve to push the locking member 50 outwardly in the radial direction and into the detent groove 52 in the shown neutral position.

The synchroniser member 54 is supported at the guiding sleeve 32 and is movable within a restricted range in the axial direction A as well as in the rotational direction D, as is shown in particular in FIG. 2.

Further, the synchroniser member 54 comprises a reception 58 for the locking member 50. By means of the locking member reception 58, the synchroniser member 54 and the locking member 50 are coupled in the axial direction A in a manner substantially free of play. Further, the synchroniser member 54 comprises engaging means 60 which co-effect with engaging means 62 of the synchroniser ring 44. Due to the engaging means 60, 62, the synchroniser member 54 and the synchroniser ring 44 are coupled in the rotational direction in a manner substantially free of play.

Further, the synchroniser member 54 comprises a pushing surface 64 with which the synchroniser ring 44 can be pressed on in the axial direction A in order to establish a friction contact between the friction surfaces 46, 48. In the shown embodiment, the engaging means 60 of the synchroniser member 54 are formed as an axial recess, the axial front face of which forms the pushing surface 64. The synchroniser ring 44 comprises a conical ring body and portions radially protruding therefrom, which are formed as engaging means 62 and engage with the recess 60 of the synchroniser member 54. Further, the synchroniser ring 44 is pressed on by these protrusions in the axial direction A.

As is shown in FIG. 1, the sliding sleeve 34 and the locking member 50 are coupled in the axial direction A through a pair of wedged surfaces 66 which form a part of the detent groove 52. Further, it is discernible from FIG. 2 that the locking member 50 and the synchroniser member 54 are coupled in the rotational direction D through a second pair of wedged surfaces 70. The angle of the first pair of wedged surfaces 66 is in the following referred to as the detent angle 68 and may range e.g. between 30° and 70°, in particular between 40° and 60° and preferably between 50° and 55°. Further, the second pair of wedges surfaces 70 forms an angle between the locking member 50 and the synchroniser member 54, which angle is referred to as locking angle in the following and may range between 30° and 70°, in particular between 40° and 60°.

As is shown in FIG. 2, the synchroniser member 54 is supported at the guiding sleeve 32 in a synchroniser member reception 74 to be movable in a limited range in the rotational direction D. In detail, the synchroniser member 54 is movable between a neutral or release position F shown in FIG. 2 and a locked position S (see FIG. 4). The transition path required for this movement is designated with 76 in FIG. 2. Stopper surfaces of the guiding sleeve 32, against which the synchroniser member 54 abuts in the rotational direction, are designated with 78 in FIG. 2.

The abutment may also occur between the locking surfaces 70.

Figure 3:
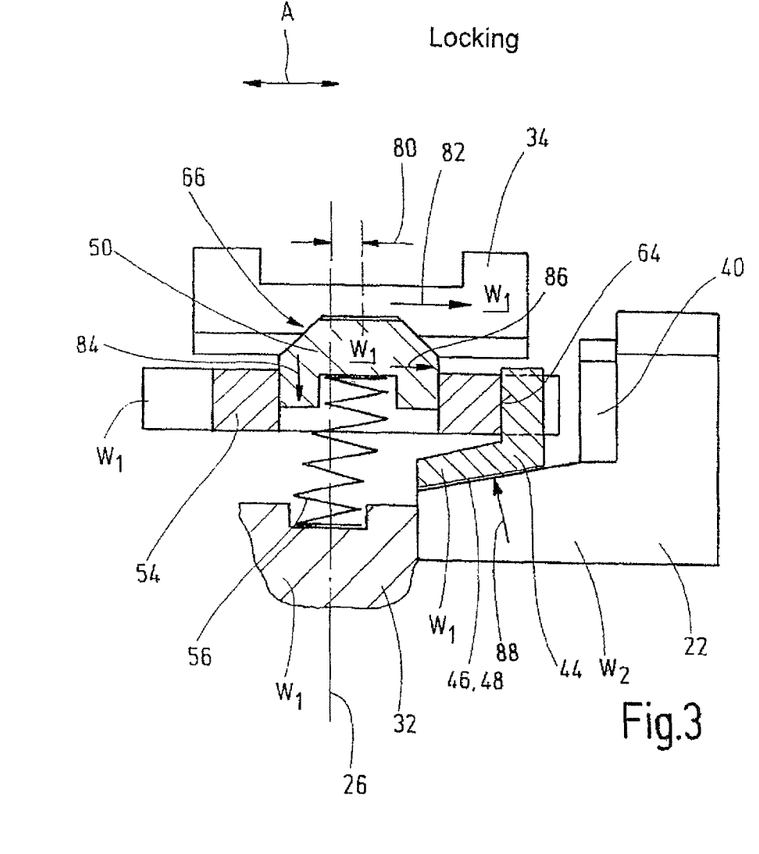
FIG. 3 shows the clutch assembly of FIG. 1 in a locked position.
Figure 4:
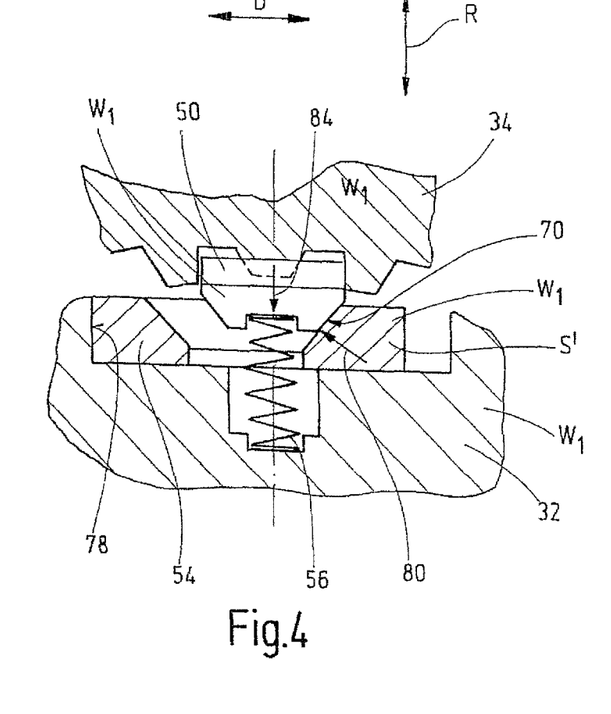
FIG. 4 shows the clutch assembly of FIG. 2 in a locked position.
Figure 5:
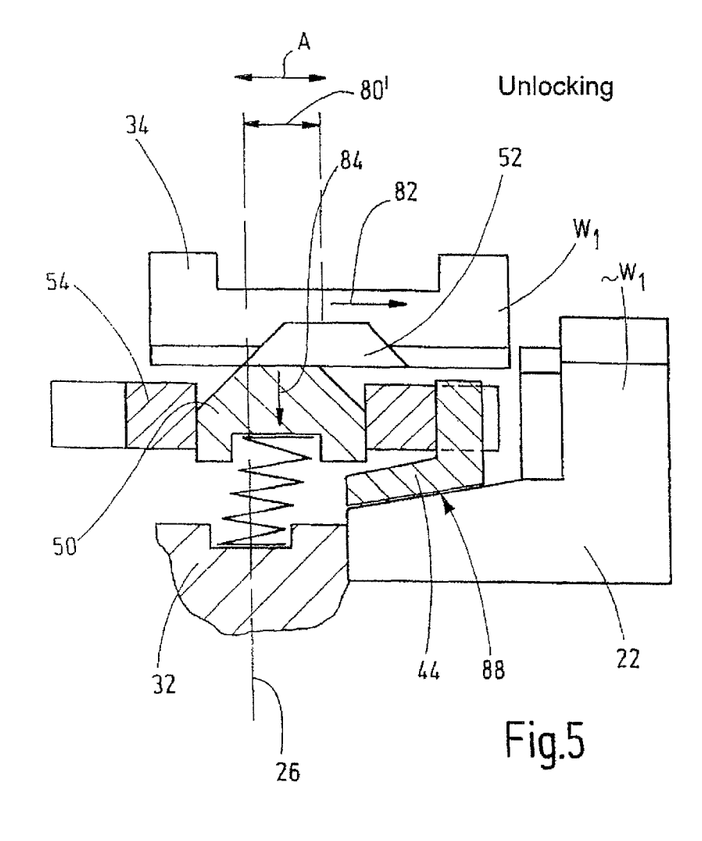
FIG. 5 shows the clutch assembly of FIG. 1 in the moment of unlocking.
Figure 6:
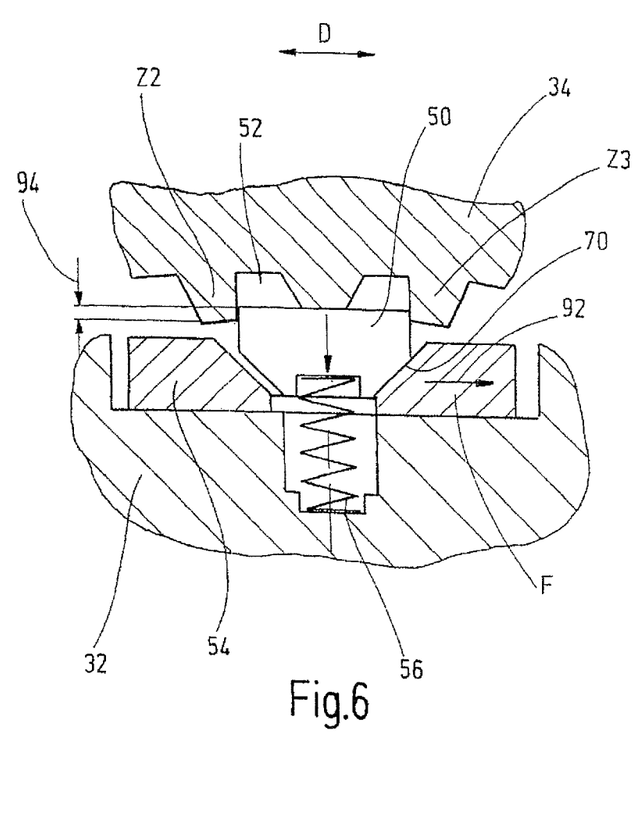
FIG. 6 shows the clutch assembly of FIG. 2 in the moment of unlocking.
Figure 7:
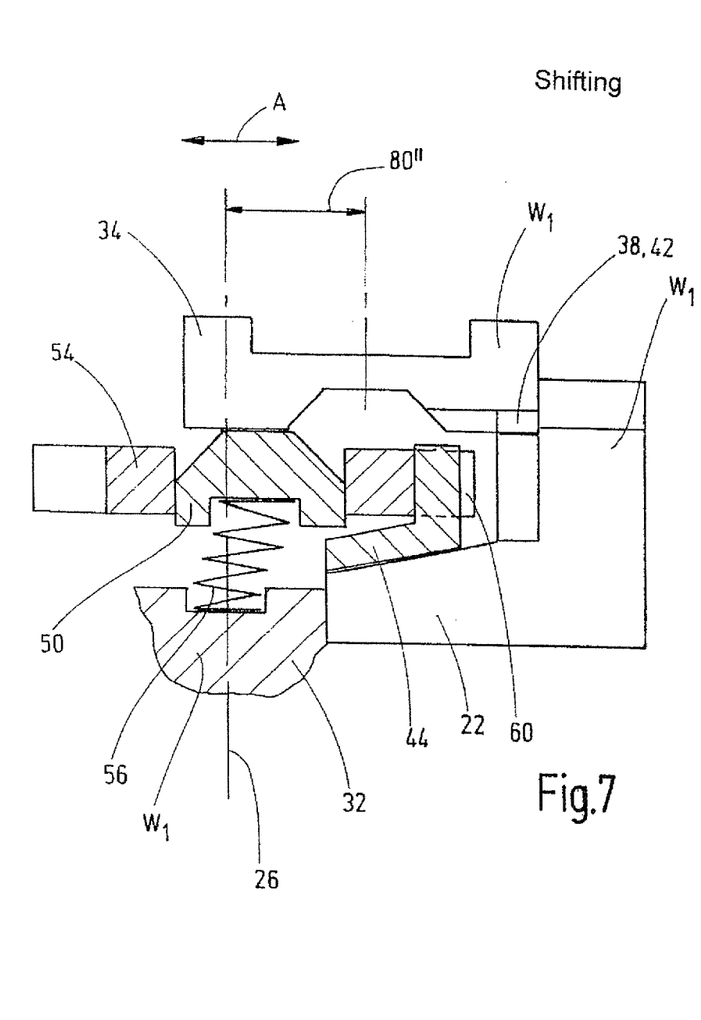
FIG. 7 shows the clutch assembly of FIG. 1 in the shifted state.
Figure 8:
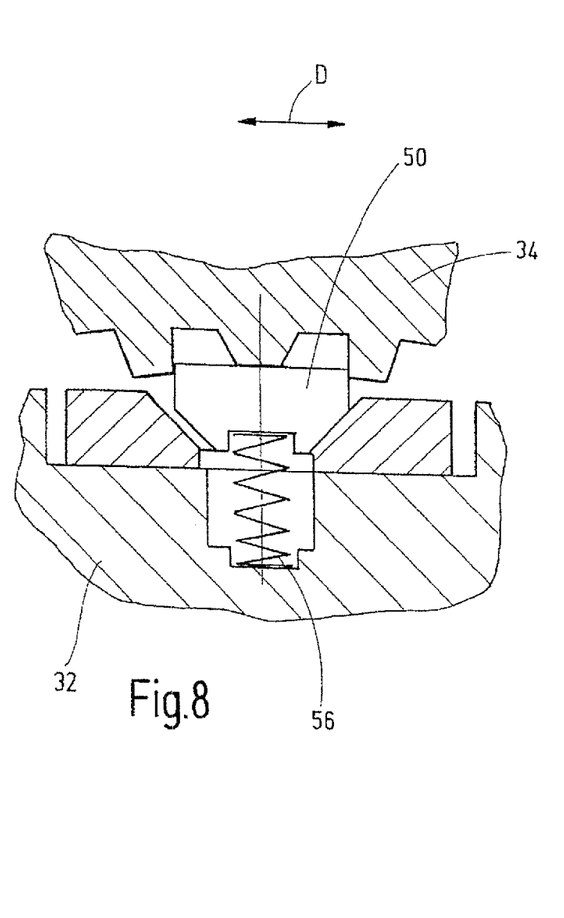
FIG. 8 shows the clutch assembly of FIG. 2 in the shifted state.

The operation of the clutch assembly shown in FIGS. 1 and 2 is explained in detail in the following with reference to FIGS. 3 to 8, wherein FIGS. 3 and 4 show how the locking means lock the sliding sleeve 34 and prevent a shifting as long as no equality of speeds between the shaft 24 and the idle gear 22 is achieved, wherein FIGS. 5 and 6 show the process of unlocking (releasing) which is enabled when the friction moment is decreased due to the synchronicity of the speeds, and wherein FIGS. 7 and 8 show the shifted state of the clutch assembly, in which the idle gear 22 and the output shaft 24 are connected in a form-fit manner in the rotational direction D through gearings 38, 42.

When the clutch assembly 30 is actuated based on the neutral or release position shown in FIGS. 1 and 2 in order to connect the idle gear 22 and the output shaft 24, an axial force 82 (shifting force) is applied to the sliding sleeve 34 through the shift fork, which pushes the sliding sleeve 34 toward the idle gear 22.

In this context, it has to be assumed that the output shaft 24 and therewith the guiding sleeve 32 and the components synchroniser member 54 and synchroniser ring 44 being connected thereto in the rotational direction in a form-fit manner feature a first speed $\omega_1$, and that the idle gear 22 has a second, different speed $\omega_2$.

As soon as the sliding sleeve 34 is pushed to the right in FIG. 3 (which results in a sliding sleeve path 80), the locking member 50 is driven in the axial direction by the first pair of wedged surfaces 66, and also the synchroniser member 54 by the axial coupling therewith, such that the pushing surface 64 presses the synchroniser ring 44 axially on the idle gear 22. Consequently, the conical friction surfaces 46, 48 are frictionally engaged. Due to this, the synchroniser member 54 is driven by the synchroniser ring 44 in the rotational direction D, until it abuts at the stopper surface 78 (see FIG. 4). In this state, the second pair of wedged surfaces 70 is engaged, such that a pressing down of the locking member 50 in the radial direction R is not possible. The shifting force applied through the sliding sleeve 34 is designated with 82 in FIG. 3. The radial force applied on the locking member 50 through the first pair of wedges surfaces 66 is designated with 84 in FIGS. 3 and 4, the axial force applied to the locking member 50 is designated with 86. The friction force generated at the pair of friction surfaces 46, 48 is schematically shown as 88, and the friction force generated at the second pair of wedged surfaces 70 is schematically shown as 90.

In FIGS. 3 and 4, a so-called locking condition is fulfilled, which prevents a pressing down of the locking member 50. In the shown clutch assembly, the locking condition is a function of the detent angle 68, the locking angle 70 and the tribologic properties. Further, the locking condition of course also depends on the friction force 88 applied through the pair of friction surfaces 46, 38.

If the speeds have been adjusted to one another ($\omega_2$ approximately equal to $\omega_1$), the friction force 88 transmitted through the pair of friction surfaces 46, 48 is relatively small, such that the locking member 50 can be pushed downward by the pair of wedged surfaces 66 (FIG. 5). Herein, the synchroniser member 54 is in addition pushed back into the release position F through the second pair of wedged surfaces 70. The return force required for this process is schematically designated with 92 in FIG. 6.

In FIG. 6, it is further discernible that an axial guidance of the locking member in the axial direction between the teeth Z2, Z3 is still secured, even if the locking member 50 is completely pushed out of the detent groove 52. The depth of the remaining recess between these two teeth Z2, Z3 of the radial groove used for the axial guidance is schematically designated with 94 in FIG. 6.

After the locking member 50 was completely pushed out of the detent groove 52, no axial force is transmitted to the synchroniser ring 44. The sliding sleeve 34 is in a so-called "free flight phase", during which it may be possible that the speeds of the output shaft 24 and the idle gear 22 diverge again. This free flight phase, however, can be configured to be relatively short, since it can be designed such that the guidance of the sliding sleeve 34 at the (not shown) outer gearing of the guiding sleeve 32 is positioned near to the clutch body 40. Based on the inventive embodiment of the clutch assembly 30, it is further possible to form the pointing of the gearing 38 relatively acute, such that a fast merging into the outer gearing 42 of the clutch body 40 is possible. The shifted state achieved therewith is shown in FIGS. 7 and 8.

In the clutch assembly 30 described in FIGS. 1 to 8, the synchroniser ring 44 does not have a locking gearing. It is also not required to form wedged surfaces at the synchroniser ring for realising the locked condition (except for the optionally provided third pair of wedged surfaces 96). The required pairs of wedges surfaces 66, 70 are exclusively established between the relatively compact components sliding sleeve 34, locking member 50 and synchroniser member 54. Consequently, the synchroniser ring 44 does not have to transmit large locking forces and may therefore be manufactured cost-effectively, e.g. as a sintered part.

Also the components synchroniser member 54 and locking member 50 can be manufactured as simple components, e.g. as sintered parts, as metal sheet parts or as forgings.

Also the axial guiding groove 53 or the detent groove 52, which have to be inserted into the sliding sleeve 34, can be realized with commonly used tools.

In the following, modified or alternative embodiments of clutch assemblies are explained on the basis of FIGS. 9 to 28. All these embodiments basically correspond to the clutch assembly 30 of FIGS. 1 to 8 as far as structure and operation are concerned. In the following, only the differences will be explained.

Figure 9:
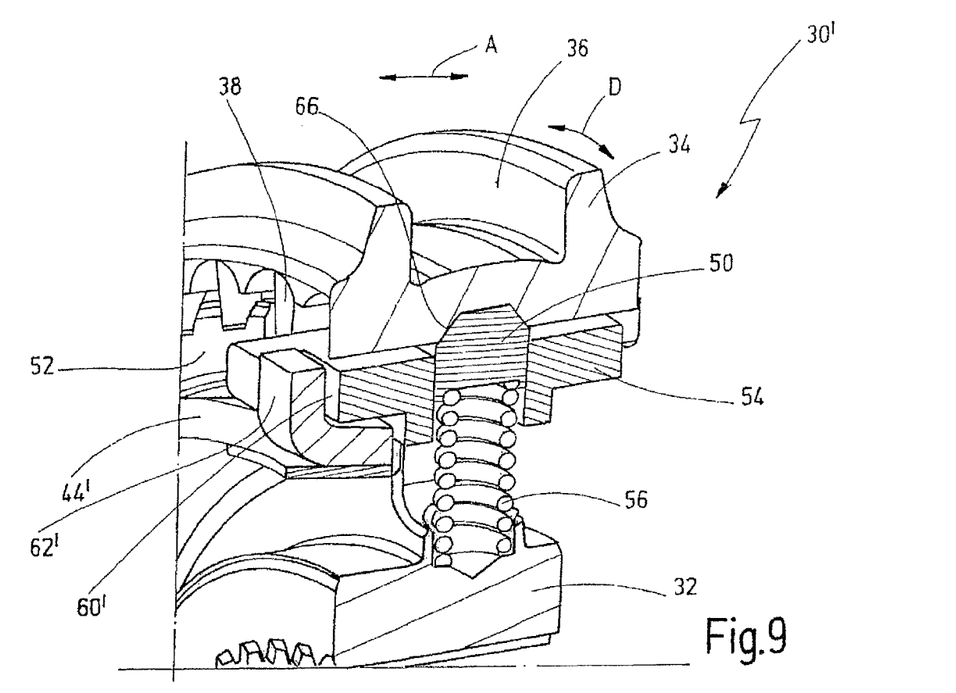
FIG. 9 shows a perspective sectional view of a further embodiment of the inventive clutch assembly.

In FIG. 9, a modified embodiment is shown, in which the engaging means 60' of the synchroniser member are formed as a recess (as in the embodiment of FIGS. 1 to 8), wherein the engaging means 62' of the synchroniser ring 44' are formed as radial protrusions meshing with the recesses 60'. In this embodiment, the radial protrusions 62' are produced separately from the cone ring of the synchroniser ring 44' and are subsequently connected thereto.

Figure 10:
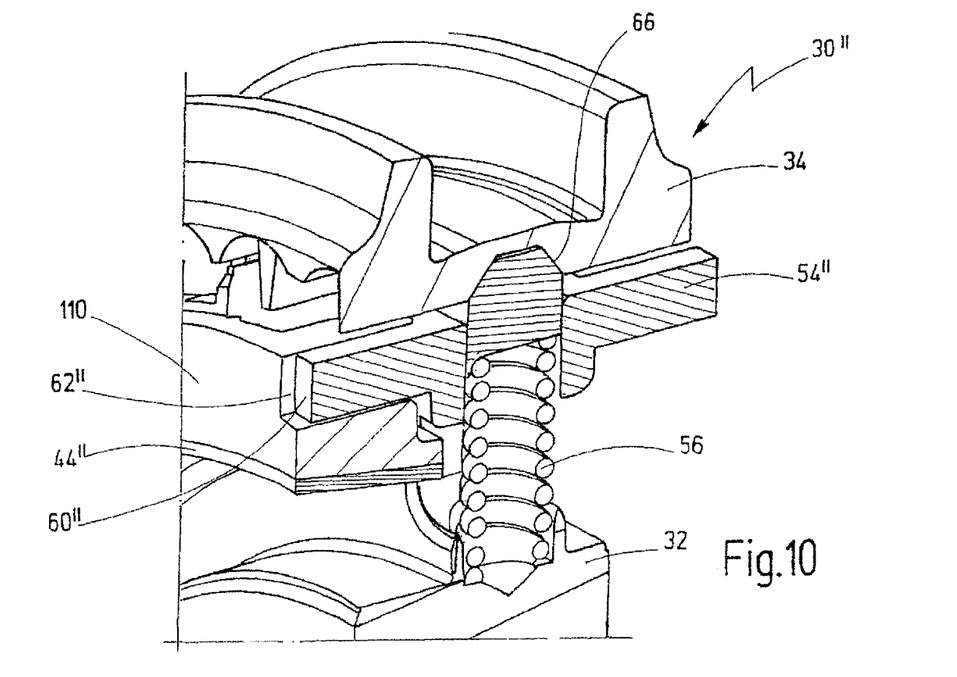
FIG. 10 shows a perspective sectional view of a further embodiment of the inventive clutch assembly.

FIG. 10 shows a further alternative embodiment, in which the synchroniser ring 44'' comprises a synchroniser ring carrier 110 in which recesses 62'' (engaging means) are formed, which engage with axial protrusions 60'' of the synchroniser member 54''.

Figure 11:
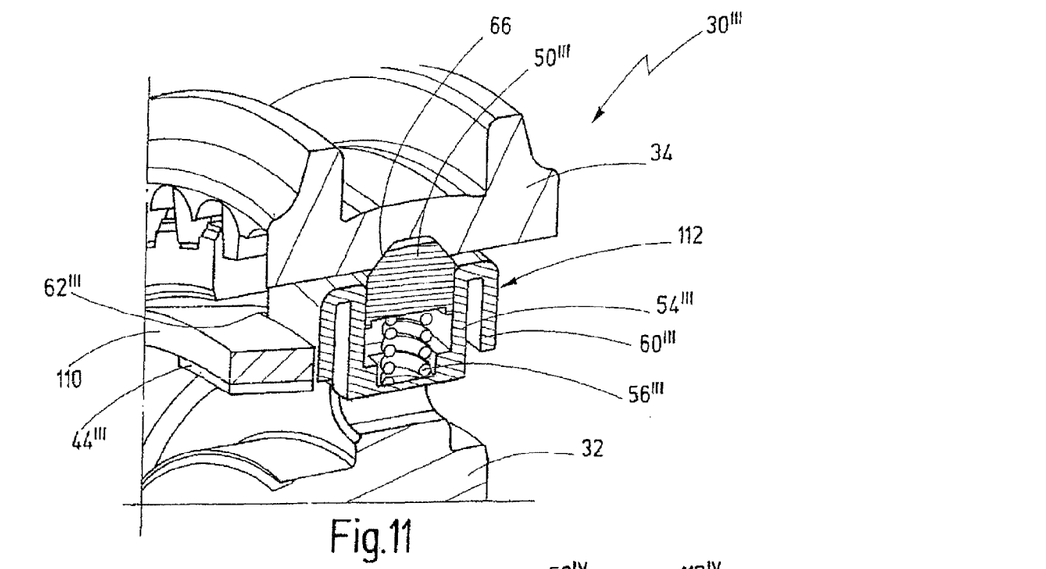
FIG. 11 shows a perspective sectional view of a further embodiment of the inventive clutch assembly.

FIG. 11 shows an embodiment in which the locking member 50''', the synchroniser member 54''' and the springs 56''' are formed as a pre-assembled unit 112.

In detail, the locking member 50''' is supported in the synchroniser member 54''' to be never lost, and the springs 56''' are disposed within the synchroniser member 54'''. In addition, protrusions 60''' are formed at the synchroniser member 54''', which engage with recesses 62''' of the synchroniser ring 44''', just like the protrusions 60'' of FIG. 10.

Figure 12:
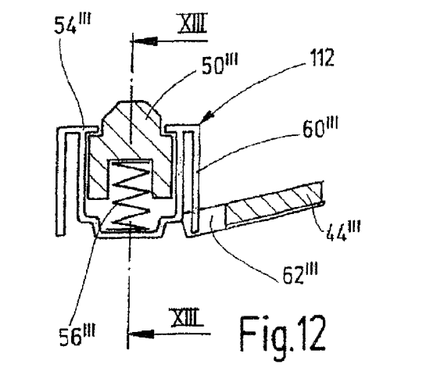
FIG. 12 shows a schematic illustration of a pre-assembled locking unit in connection with a portion of a synchroniser ring.

In the embodiment 30''' of FIG. 12, the synchroniser member 54''' can be formed as a sintered part or as a bent metal sheet part.

FIG. 12 schematically shows the pre-assembled unit 112 of FIG. 11, wherein it is also shown that protrusions are formed at the synchroniser member 56''', which prevent that the locking member 50''' detaches from the synchroniser member 56'''.

Figure 13:
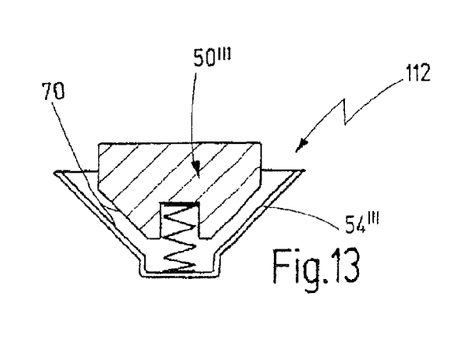
FIG. 13 shows a sectional view along line XIII-XIII of FIG. 12.

FIG. 13 shows a sectional view along the line XIII-XIII of FIG. 12. As shown, the synchroniser member 54''' can be formed as a metal sheet part, whereas the locking member 50''' can be formed as a compact component, e.g. as a sintered part.

Figure 14:
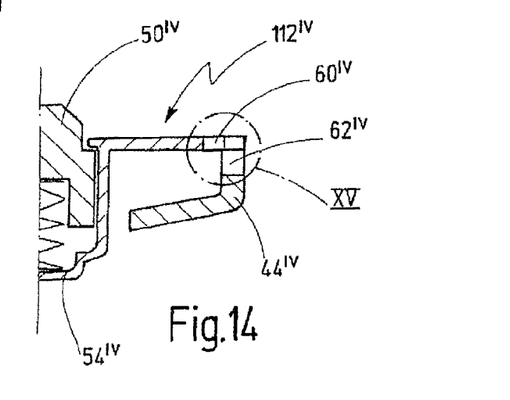
FIG. 14 shows an alternative combination of the pre-assembled locking unit including a synchroniser ring.

FIG. 14 shows a modification of the embodiment 30''' of FIGS. 11 to 13, wherein an axial protrusion having a recess $60^{IV}$ is formed at the synchroniser member $54^{IV}$ of the pre-assembled unit $112^{IV}$, into which a protrusion $62^{IV}$ of the synchroniser ring $44^{IV}$ engages (similar to the embodiment of FIGS. 1 to 8).

Figure 15:
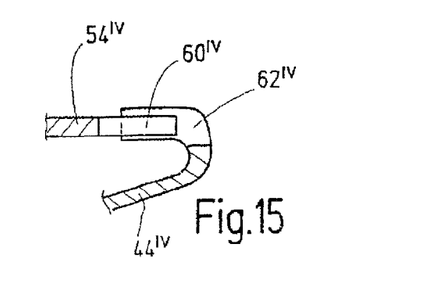
FIG. 15 shows a detailed view XV of FIG. 14.

FIG. 15 shows a detailed view XV of FIG. 13 and shows e.g. a relatively large coverage between the engaging means $60^{IV}$, $62^{IV}$.

Figure 16:
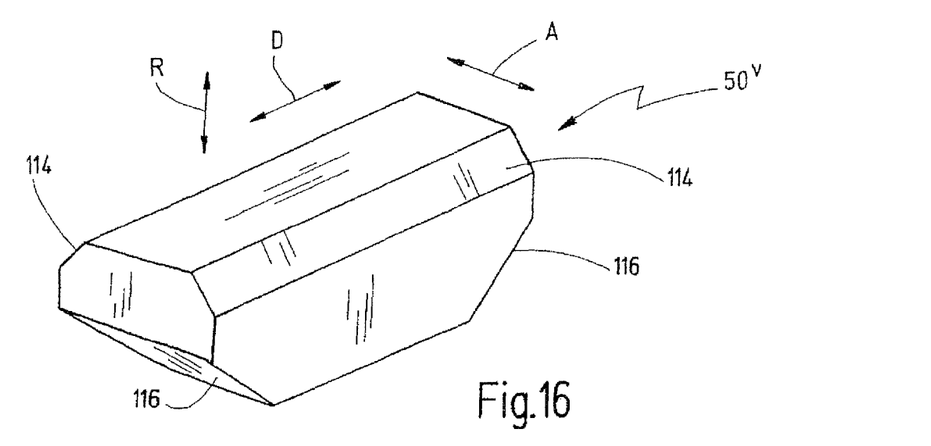
FIG. 16 shows a perspective view of a locking member of an inventive clutch assembly.

FIG. 16 shows an embodiment of a locking member $50^{V}$. It is discernible in the illustration of FIG. 16 that a locking member $50^{V}$ comprises wedged surfaces 114 arranged oppositely in the axial direction A, which form part of a first pair of wedged surfaces 66. It is further discernible that the locking member $50^{V}$ comprises second wedged surfaces 116 arranged oppositely in the rotational direction D, which respectively form a part of the second pair of wedged surfaces 70.

Figures 17, 18, 19:
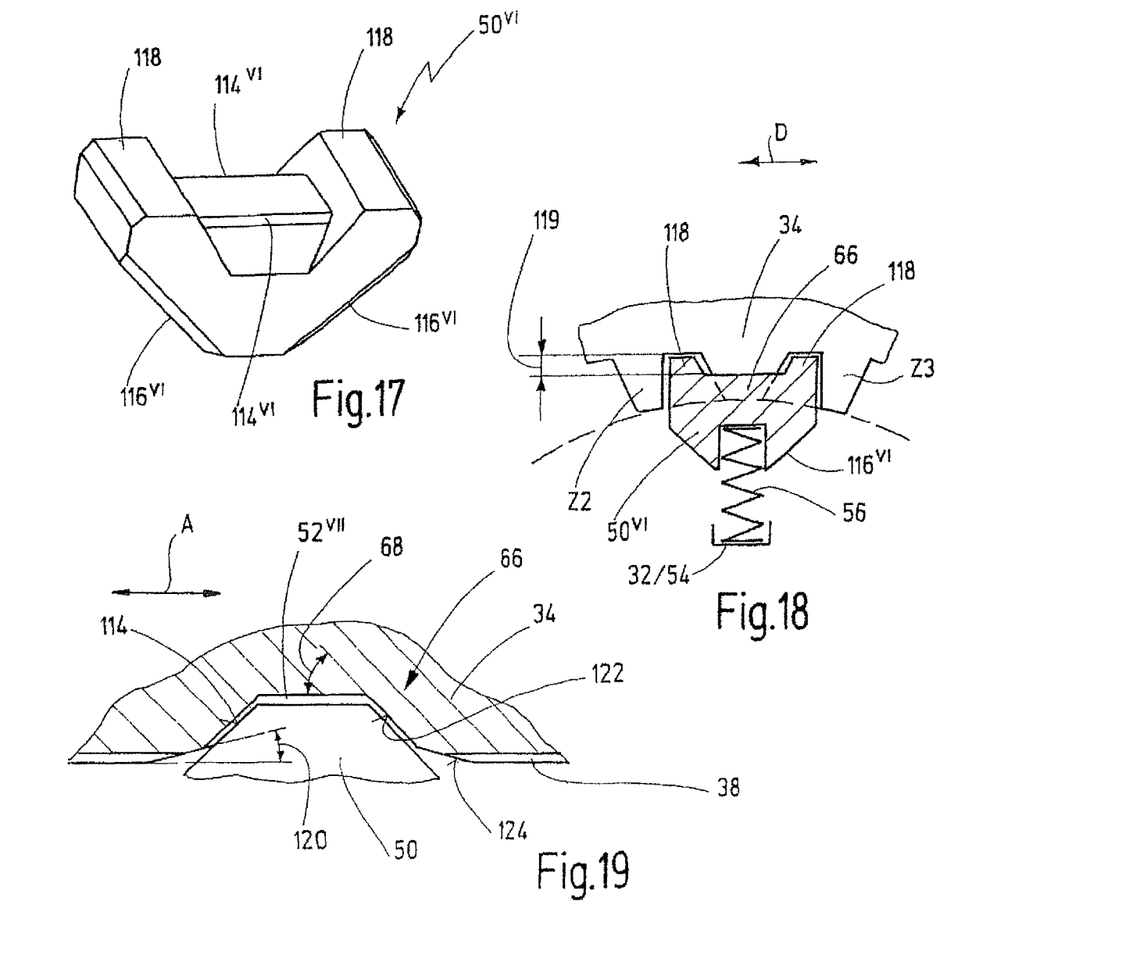
FIG. 17 shows a perspective view of an alternative embodiment of a locking member of an inventive clutch assembly.
FIG. 18 shows a schematic cross-sectional view of a further embodiment of an inventive clutch assembly.
FIG. 19 shows a schematic view of a modified detent groove of a sliding sleeve of an inventive clutch assembly.

In FIG. 17, a variation of a locking member $50^{VI}$ is shown, which comprises guiding noses 118 respectively extending in the axial direction A at its ends opposing in the rotational direction D, which guiding noses protrude in the radial direction R with respect to an upper side of the locking member.

The guiding noses 118 are configured to engage with tooth gaps in the inner gearing 38, as is shown as an example in FIG. 18.

With this embodiment, the stability of the axial guidance can be enhanced considerably, since a guidance depth increase 119 results in the radial direction, which is schematically indicated in FIG. 18.

In this embodiment, all teeth Z of the sliding sleeve 34 may have the same height, i.e. be arranged without any retreated teeth, such that the inner diameter of the sliding sleeve 34 can be substantially constant (as it is schematically indicated in FIG. 18 by a dashed inner diameter).

FIG. 19 shows a modified embodiment of a detent groove 52$^{VII}$. The detent groove 52$^{VII}$ comprises wedged surfaces 122 which form a part of the first pair of wedged surfaces 66. At the transitional area from the wedges surfaces 122 to the axially extending gearing 38, chamfers 124 are provided which have a chamfer angle 120 which is considerably smaller than the detent angle 68. The chamfer angle may e.g. range between 5° and 40°, in particular between 10° and 30°.

With these chamfers 124, an underlocking system can be generated during unlocking. In other words, this means that the synchroniser ring 44 is still pushed against the idle gear 22 to a certain extent, whereas the edge of the locking member is pushed along the chamfer. The anew acceleration of the idle gear 22 may thus be prevented more easily. In other words, the free flight phase can be shortened. However, the chamfer angle 120 will preferably be selected such that no locking condition can be actuated by same.

Figure 20:
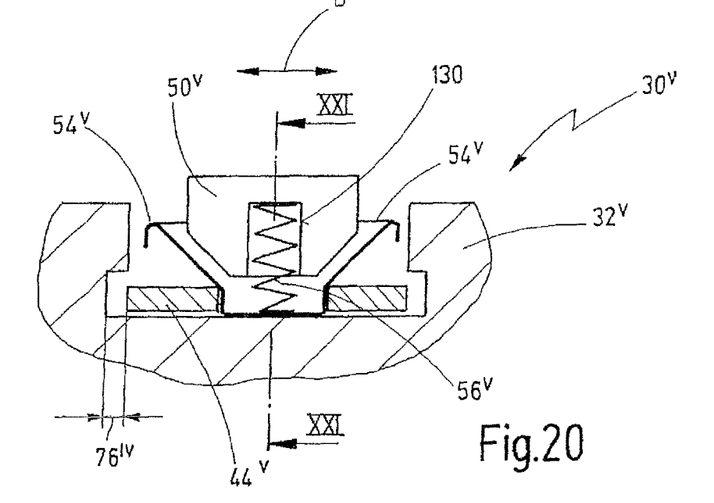
FIG. 20 shows a sectional view corresponding to FIG. 2 of a further embodiment of an inventive clutch assembly.

FIG. 20 shows an illustration corresponding to FIG. 2 of a further embodiment of an inventive clutch assembly 30$^V$. The synchroniser member 54$^V$ is formed as a bent metal sheet part. The locking member 50$^V$ comprises a recess 130 at its radial inside for receiving and guiding the springs 56$^V$ (in particular in the shown embodiment as a coil spring).

Figure 21:
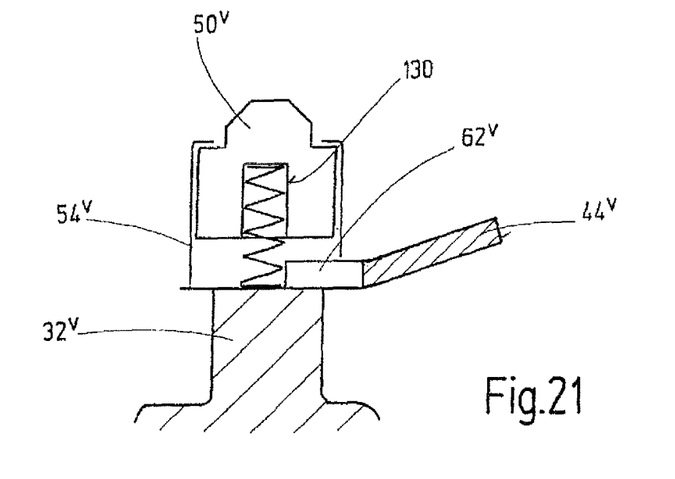
FIG. 21 shows a sectional view along line XXI-XXI of FIG. 20.

FIG. 21 shows a sectional view along the line XXI-XXI of FIG. 20 and shows how engaging means 62$^V$ can be formed at the synchroniser ring 44$^V$, which engage with a recess of the synchroniser member 54$^V$.

Figure 22:
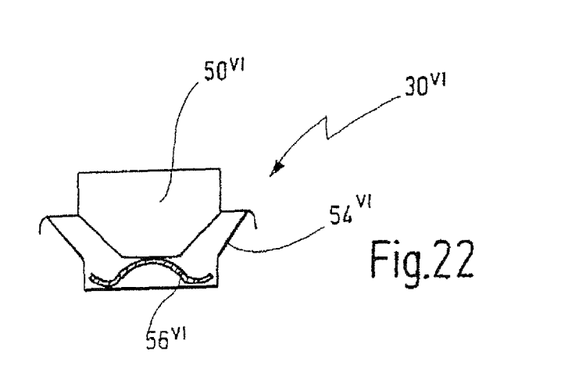
FIG. 22 shows a schematic view of a further embodiment of an inventive clutch assembly.

FIG. 22 shows a further embodiment of an inventive clutch assembly 30$^{VI}$, wherein the springs 56$^{VI}$ are formed as a kind of plate spring or the like.

Figure 23:
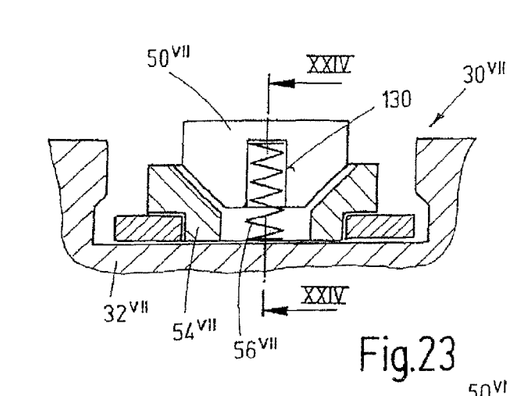
FIG. 23 shows a further embodiment of an inventive clutch assembly corresponding to the illustration of FIG. 2.
Figure 24:
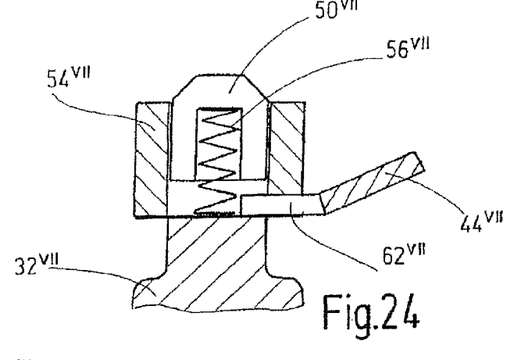
FIG. 24 shows a sectional view along line XXIV-XXIV of FIG. 23.

FIGS. 23 and 24 show a further alternative embodiment of an inventive clutch assembly 30$^{VII}$, wherein the basic structure and operation are similar to that of the clutch assembly 30$^V$ of FIGS. 20 and 21. In the clutch assembly 30$^{VII}$, the synchroniser member 54$^{VII}$ is, however, not formed as a sheet metal part, but as a compact component (e.g. a sintered component or a forging).

Figure 25:
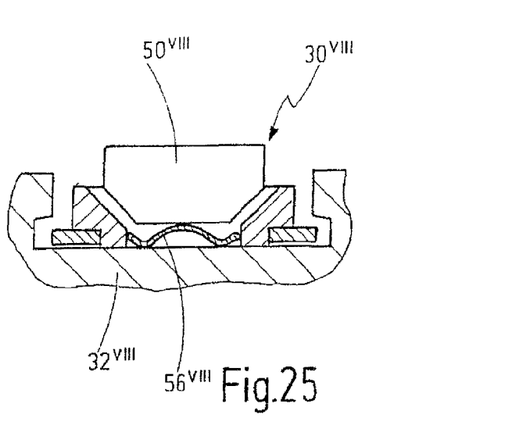
FIG. 25 shows a further embodiment of an inventive clutch assembly corresponding to the illustration of FIG. 2.

FIG. 25 shows a further embodiment of an inventive clutch assembly 30$^{VIII}$ wherein, similar to the embodiment of FIG. 22, a plate spring is used as spring 56$^{VIII}$. It is obvious that no recess has to be provided at the radial inside of the locking member 50 when using a plate spring.

Figure 26:
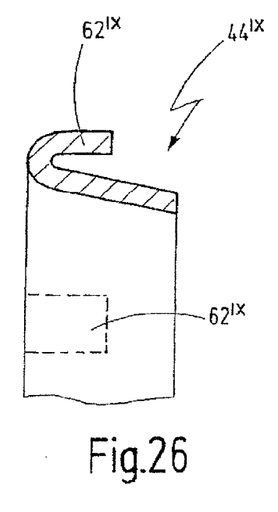
FIG. 26 shows a schematic view of a synchroniser ring for an inventive clutch assembly.
Figure 27:
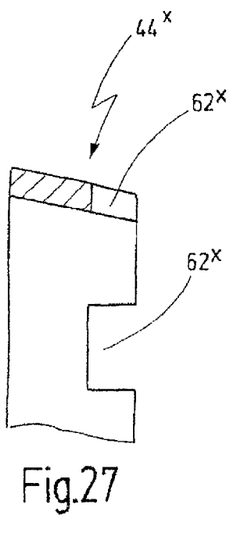
FIG. 27 shows a schematic view of a further embodiment of a synchroniser ring for an inventive clutch assembly.
Figure 28:
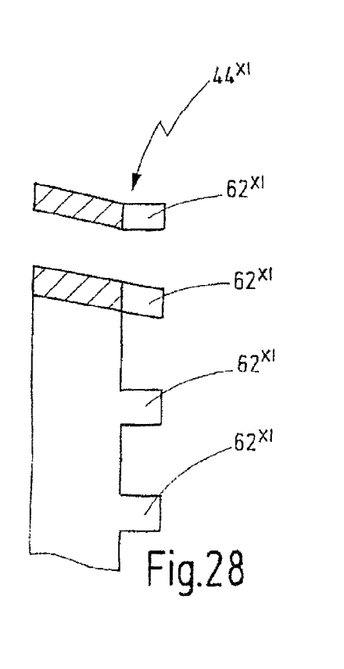
FIG. 28 shows a schematic view of a further embodiment of a synchroniser ring for an inventive clutch assembly.

FIGS. 26 to 28 show different embodiments of synchroniser rings which are suited to be used in the inventive clutch assembly. In particular, the synchroniser rings differ from those of the state of the art in that they do not comprise a locking gearing. The engaging means are partly formed as radial protrusions 62$^{IX}$, alternatively as axial recesses 62$^X$ or as axial protrusions 62$^{XI}$. It is obvious that preferably a plurality of the shown engaging means are distributed about the periphery of the respective synchroniser ring; preferred is a number of three engaging means per periphery.

The invention claimed is:

1. A clutch assembly for connecting a shaft to a rotary member mounted on said shaft in a rotationally fixed manner, the clutch assembly comprising:
    a sliding sleeve which is rotationally fixed to the shaft, is axially slidably mounted on said shaft and is provided with a first gearing;
    a clutch body which is rotationally fixed to the rotary member and provided with a second gearing which can mesh with the first gearing to connect the shaft and the rotary member in a rotationally fixed manner; and
    a locking synchronisation unit having a synchroniser ring with a friction surface, said ring permitting the speeds of the shaft and the rotary member to be synchronised before the meshing of the first and second gearings, wherein the locking synchronisation unit further comprises a locking member which is coupled to the sliding sleeve by a detent groove and to the synchroniser ring in the rotational direction (D) by a pair of locking surfaces, wherein the pair of locking surfaces is situated between the locking member and a synchroniser member, the latter being coupled to the locking member in the axial direction (A) and to the synchroniser ring in the rotational direction (D), wherein relative movement in the rotational direction (D) between the locking member and the synchronizer member is hindered.

2. The clutch assembly of claim 1, wherein the synchroniser member is supported in the rotational direction (D) with respect to a guiding sleeve connected to the shaft between a release position (F) and a locking position (S) to be movable in a restricted manner such that the synchroniser member, when in the locking position (S), prevents movement of the locking member out of the detent groove and thus an axial movement of the sliding sleeve.

3. The clutch assembly of claim 2, wherein the synchronizer ring has a recess in which a portion of the synchronizer member is arranged to be coupled to the synchronizer ring in the rotational direction (D).

4. The clutch assembly of claim 3, wherein the recess of the synchronizer ring is formed as an axial recess.

5. The clutch assembly of claim 1, wherein the synchroniser ring has a recess in which a portion of the synchroniser member is arranged to be coupled to the synchroniser ring in the rotational direction (D).

6. The clutch assembly of claim 5, wherein the recess of the synchroniser ring is formed as an axial recess.

7. The clutch assembly of claim 1, wherein the synchroniser ring comprises a protrusion, which meshes with a recess of the synchroniser member, to be coupled with the synchroniser member in the rotational direction (D).

8. The clutch assembly of claim 1, wherein the locking member is guided in the axial direction (A) at the sliding sleeve.

9. The clutch assembly of claim 8, wherein the sliding sleeve comprises a radial recess in which the locking member is axially guided.

10. The clutch assembly of claim 8, wherein the locking member comprises at least one guiding nose, which meshes with a tooth gap of the first gearing, to be axially guided at the sliding sleeve.

11. The clutch assembly of claim 9, wherein the locking member comprises at least one guiding nose which meshes with a tooth gap of the first gearing, to be axially guided at the sliding sleeve.

12. The clutch assembly of claim 1, wherein the locking member is elastically biased in the radial direction (R) with respect to the shaft or the sliding sleeve and is pressed into the detent groove.

13. The clutch assembly of claim 1, wherein the locking member is elastically biased in the radial direction (R) with respect to the synchroniser member and is pressed into the detent groove.

14. The clutch assembly of claim 13, wherein the locking member comprises a recess for receiving a spring member for realizing the elastic biasing.

15. The clutch assembly of claim 1, wherein the locking member and the synchroniser member are formed as a pre-assembled unit.

16. The clutch assembly of claim 15, wherein the pre-assembled unit comprises spring members for elastically biasing the locking member with respect to the synchroniser member.

17. The clutch assembly of claim 1, wherein the locking member and/or the synchroniser member is/are formed as a sintered part.

18. The clutch assembly of claim 1, wherein the synchroniser member is formed as a bent sheet metal part.

19. The clutch assembly of claim 1, wherein the detent groove comprises a locking surface and a chamfer at the transitional area from the locking surface to the first gearing.

20. The clutch assembly of claim 1, characterized by comprising a plurality of locking synchronisation units which respectively comprise a locking member and a synchroniser member and which are distributedly arranged about the periphery of the clutch assembly.

21. A clutch assembly for connecting a shaft to a rotary member mounted on said shaft in a rotationally fixed manner, the clutch assembly comprising:
- a sliding sleeve which is rotationally fixed to the shaft, is axially slidably mounted on said shaft and is provided with a first gearing;
- a clutch body which is rotationally fixed to the rotary member and provided with a second gearing which can mesh with the first gearing to connect the shaft and the rotary member in a rotationally fixed manner; and
- a locking synchronization unit having a synchronizer ring with a friction surface, said ring permitting the speeds of the shaft and the rotary member to be synchronized before the meshing of the first and second gearings,
- wherein the locking synchronization unit further comprises a locking member which is coupled to the sliding sleeve by a detent groove,
- the locking member is coupled to a synchronizer member in the rotational direction through a pair of wedges surfaces and is also coupled to the synchronizer member in axial direction, and
- the synchronizer member is coupled in axial and in rotational direction to the synchronizer ring.

22. A clutch assembly for connecting a shaft to a rotary member mounted on said shaft in a rotationally fixed manner, the clutch assembly comprising:
- a sliding sleeve which is rotationally fixed to the shaft, is axially slidably mounted on said shaft and is provided with a first gearing;
- a clutch body which is rotationally fixed to the rotary member and provided with a second gearing which can mesh with the first gearing to connect the shaft and the rotary member in a rotationally fixed manner, and
- a locking synchronization unit having a synchronizer ring with a friction surface, said ring permitting the speeds of the shaft and the rotary member to be synchronized before the meshing of the first and second gearings, wherein the locking synchronization unit further comprises a locking member which is coupled to the sliding sleeve by a detent groove and to the synchronizer ring in the rotational direction by a pair of locking surfaces,
- wherein the pair of locking surfaces is situated between the locking member and a synchronizer member, the synchronizer member comprising a reception for the locking member,
- the synchronizer member being coupled to the locking member through the locking member reception in axial direction, and
- the synchronizer member being coupled to the synchronizer ring in the rotational direction.

* * * * *